United States Patent Office 3,264,315
Patented August 2, 1966

3,264,315
AZOLYL-THIOPHENE COMPOUNDS
Erwin Maeder, Aesch, Basel-Land, Peter Liechti, Binningen, and Adolf Emil Siegrist, Basel, Switzerland, assignors to Ciba Limited, Basel, Switzerland, a company of Switzerland
No Drawing. Filed Dec. 4, 1963, Ser. No. 328,112
Claims priority, application Switzerland, July 19, 1961, 8,481/61; Dec. 21, 1962, 15,058/62
27 Claims. (Cl. 260—304)

This is a continuation-in-part of our copending application Ser. No. 210,209, filed July 16, 1962, and now abandoned.

The present invention provides new, valuable azolylthiophene componuds which, like for instance the compound of the formula (1) 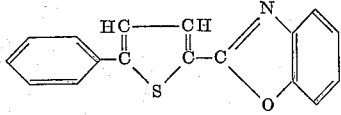

correspond to the general formula (2) 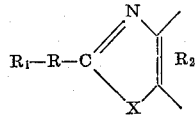

in which $R_1$ represents a benzene or naphthalene radical and R a thiophene radical bound in position 2 to $R_1$ and in position 5 to the azole ring, X represents the complement to the azole ring and $R_2$ stands for a benzene or naphthalene radical bound with the azole ring in the manner indicated by the valence lines.

The new azolylthiophene compounds of the Formula 2 may be oxazolylthiophene compounds (when X is —O—) or thiazolylthiophene compounds (when X is —S—) or imidazolylthiophene compounds. The imidazolylthiophene compounds contain as group X either an —NH— group or a group

in which A stands for an organic substituent, for example an alkyl, alkenyl or a hydroxyalkyl group, or a cyanoalkyl group containing, for example, up to 4 carbon atoms, or an aralkyl radical such as benzyl, or an acyl group such as acetyl, benzoyl or para-methoxybenzoyl. The benzene or naphthalene radical $R_2$ is condensed with the azole ring in the manner indicated by the valence lines, that is to say that two carbon atoms are at the same time cyclic members of the aromatic and of the heterocyclic ring.

The radicals $R_1$ and $R_2$ may be naphthalene radicals; preferably, they are benzene radicals and may contain further substituents, for example alkyl, alkoxy groups, halogen (such as chlorine or fluorine) atoms, nitrile groups, cyanoalkyl, carboxyalkyl or carbalkoxyalkyl groups, phenyl, phenylalkyl or cycloalkyl groups, or sulfonic acid groups, free or neutralized carboxyl groups (—COOH or ammonium, metal or amine salts) or functionally converted oxygen-containing carboxylic acid groups linked directly with a carbon atom of an aromatic six-membered ring. Suitable functionally converted carboxylic acid groups containing the oxo-oxygen atom are above all the carboxylic acid ester groups and among them the carboxylic acid alkyl ester groups; furthermore alkenyl ester, aryl ester and aralkyl ester groups. Likewise suitable are carboxylic acid amide and carboxylic acid hydrazide groups either of which may have substituents attached to the nitrogen atoms. The free or neutralized carboxyl group or functionally converted oxygen-containing carboxylic acid group is preferably linked directly with $R_2$, inter alia also because this type of compound is readily accessible.

From among the new azolylthiophene compounds of the composition defined above there may be mentioned as examples those of the formula (3) 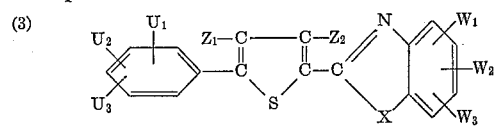

where $U_1$ and $U_2$ are identical or different and each represents a hydrogen or halogen (such as chlorine or flourine) atom, or an alkyl or alkoxy group with 1 to 4 carbon atoms; $U_3$ represents a hydrogen atom or an alkoxy group with 1 to 4 carbon atoms, $W_1$ a hydrogen or halogen (such as chlorine or fluorine) atom, a phenyl, phenylalkyl or alkoxy group or a saturated non-aromatic hydrocarbon radical containing up to 12 carbon atoms, or a cyanoalkyl, carboxyalkyl or carbalkoxyalkyl radical with up to 12 carbon atoms, such as cyanoethyl, carboxyethyl or carbomethoxyethyl or a free or neutralized carboxyl group, a carboxylic acid (lower or higher) alkyl ester group, a carboxylic acid(lower)alkenyl ester group, a carboxylic acid ar(lower)alkyl ester group, for example a carboxylic acid benzyl ester group, a carboxylic acid aryl ester group such as,

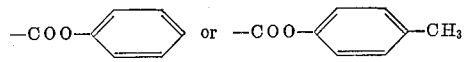

the carboxylic acid amide group —CO—NH$_2$, a carboxylic acid amide group organically substituted at the nitrogen such as

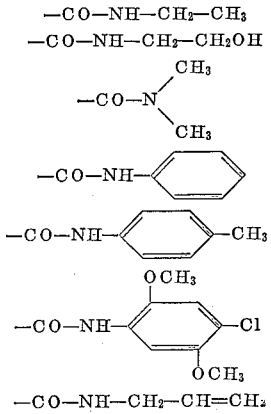

and

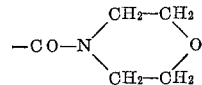

or a carboxylic acid hydrazide group; $W_2$ and $W_3$ are identical or different and each represents a hydrogen atom or an alkyl group with 1 to 4 carbon atoms, or $W_2$ and $W_3$, together with two vicinal carbon atoms of the benzene ring, may represent a six-membered alicyclic ring; $Z_1$ and $Z_2$ are identical or different and each represents a hydrogen atom or a hydrocarbon radical with 1 to 7 carbon atoms, for example a methyl, ethyl, tertiary butyl, phenyl, tolyl, benzyl or cyclohexyl group, and X stands for an oxygen atom, the —NH— group or a group

in which A has the above meaning. As saturated non-aromatic hydrocarbon radicals containing up to 12 carbon atoms there may be mentioned the straight-chain or branched alkyl groups of the formula $$-C_nH_{2n+1}$$

(where $n$ is a whole number from 1 to 12, also cycloalkyl groups, more especially cyclohexyl.

Among these azolylthiophene compounds of the Formula 3 there may be especially mentioned those which correspond to the formula

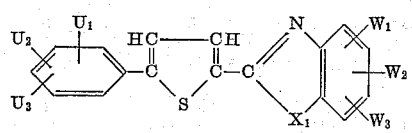

in which $U_1$, $U_2$, $U_3$, $W_1$, $W_2$ and $W_3$ have the above meanings and $X_1$ represents an oxygen atom, or the —NH— group or a group of the formula

in which $A_1$ represents an alkyl or cyanoalkyl group with up to 4 carbon atoms, an aralkyl radical such as benzyl, or an aroyl radical such as benzoyl or paramethoxybenzoyl.

The azolylthiophene compounds of the Formula 2 can be made by reacting a monocarboxylic acid of the formula (5)      $R_1$—R—COOH —in which $R_1$ represents a benzene or naphthalene radical and R a thiophene radical linked in position 2 to $R^1$ and in position 5 to the carboxyl group—or a functional derivative of such a monocarboxylic acid at an elevated temperature and preferably in the presence of a catalyst, with an ortho-amino compound of the formula (6)

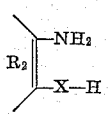

in which X represents an oxygen atom, a sulfur atom, an —NH— group or a group

in which A has the above meaning and $R_2$ represents a benzene or naphthalene radical to which —$NH_2$ and X are bound in vicinal position, and, if desired, when X represents an —NH— group, the resulting azolylthiophene is treated with an alkylating, alkenylating, hydroxyalkylating, cyanoalkylating, acylating or aralkylating agent.

The monocarboxylic acids of the Formula 5, used as starting materials for the process described above, are either known or can be prepared by known methods (see Journ. Org. Chem., 21, pages 39 to 44 [1956]). Suitable functional derivatives of the monocarboxylic acids of the Formula 5 are their esters with lower aliphatic alcohols, for example the methyl or ethyl ester, and more especially the acid chlorides.

As further starting materials there are used in the present process ortho-amino compounds of the Formula 6, in the case of the imidazolylthiophene compounds preferably ortho-diamines of the benzene series of which one amino group is primary and the other primary or secondary, for example, 1:2-diaminobenzene,
1-amino-2-monomethyl-aminobenzene,
1-methyl-3:4-diaminobenzene,
3:4-diamino-1:2-dimethylbenzene,
1-methoxy-3:4-diaminobenzene,
isopropyl-ortho-phenylenediamine or
1-chloro-3:4-diaminobenzene.

In the case of the oxazolylthiophene compounds there are suitable as starting materials, for example, 1-amino-2-hydroxynaphthalene,
1-hydroxy-2-aminobenzene and,
1-hydroxy-2-aminomethylbenzenes, such as,
1-hydroxy-2-amino-4- or -5-methylbenzene, furthermore
1-amino-2-hydroxy-5-methoxybenzene,
1-amino-2-hydroxy-5-tertiary butylbenzene,
1-amino-2-hydroxy-5-chlorobenzene,
4-hydroxy-3-aminobenzene-1-carboxylic acid methyl ester,
1-amino-2-hydroxy-5-fluorobenzene and
1-amino-2-hydroxy-4:5-dimethylbenzene, and in the case of the thiazolylthiophene compounds a suitable starting material is, for example, 1-amino-2-mercaptobenzene.

It is of advantage to use for the reaction any pair of starting materials—namely the ortho-amino compounds of the above Formula 6 and the monocarboxylic acid of the Formula 5 or its functional derivatives—in an at least approximately appropriate theoretical ratio, that is to say that for every molecular proportion of monocarboxylic acid 1 molecular proportion of an amino compound of the Formula 6 or a proportion that is only little above or below one molecular equivalent is used. The reaction of the two reactants is performed by heating them to an elevated temperature, for example to about 90 to 260° C., if desired in an inert gas, for example a current of nitrogen. The reaction is advantageously performed in the presence of a catalyst. Suitable catalysts are, for example, boric acid, sulfonic acids of the benzene series such as para-toluene-sulfonic acid; furthermore polyphosphoric acids including pyrophosphoric acid and zinc chloride. It is of advantage to conduct the reaction so that a compound of the Formula 2 is directly formed, that is to say that the acylation of the ortho-amino compound and the cyclization leading to the individual azole ring are carried out in a single step.

When boric acid is used as catalyst, it is of advantage to use it in an amount of about 0.5 to 5% calculated from the total weight of the batch. It is also possible to use concomitantly a high-boiling organic solvent, for example a substitution product of benzene such as ortho-dichlorobenzene or a trichlorobenzene, or a high-boiling hydrocarbon of the benzene series such as a xylene or para-cymene, or more especially a high-boiling polar organic solvent such, for example, as dimethylformamide, or an aliphatic (if desired etherified) hydroxy compound, for example propyleneglycol, ethyleneglycol monoethyl ether or diethyleneglycol diethyl ether. Alternatively, the azolylthiophene compounds of the general Formula 2 can also be manufactured by simply fusing together the two starting materials in a zinc chloride melt or in the presence of boric acid.

The reaction of the ortho-diamino compound with the monocarboxylic acid of the Formula 5 or with a functional derivative of such an acid, yielding the imidazolylthiophene compound of the general Formula 2 is advantageously performed by heating the two starting materials in an aqueous mineral acid, such as hydrochloric or phosphoric acid or preferably in aqueous sulfuric acid, to an elevated temperature ranging, for example, from 90 to 110° C.

On completion of the reaction the azolylthiophene compound of the general Formula 2 can be isolated from the reaction mixture in any such known manner.

It is possible to introduce, if desired, into imidazolylthiophene compounds of the Formula 2—whose imidazole ring contains a hydrogen atom attached to a nitrogen atom (X=—NH—)—the substituents mentioned above by treating said compounds with an alkylating, alkenylating, hydroxyalkylating, cyanoalkylating, acylating or aralkylating agent. Furthermore, the azolylthiophene compounds can be sulfonated.

The new azolylthiophene compounds of the Formula 2 may be used, for example, as intermediates in the manufacture of dyestuffs, though their use as optical brighteners is of special value. They may be used for optically brightening a wide variety of materials, more especially organic materials. Good results are obtained, for example, in brightening polyolefines, such, for example, as polyethylene or polypropylene, of acetylcellulose, alkyd resin lacquers or nitrocellulose lacquers. The new azolylthiophene compounds are particularly useful in brightening synthetic fibers. Thus, for example, the imidazolylthiophene compounds of the Formula 4 produce on polyacrylonitrile fibers and, for example, the oxazolylthiophene compounds of the Formula 4 on polyester fibers particularly valuable brightening effects when applied by the conventional methods. The brightening agent is advantageously fixed on said fibers from an aqueous liquor at an elevated temperature ranging for example, from 50 to 90° C. If desired, for example when it is not easy to convert the new compounds into a state of fine and even distribution, a dispersant may be added, for example a soap, polyglycol ethers of fatty alcohols, fatty amines or alkylated phenols, cellulose sulfite waste liquor or condensation products of (possibly alkylated) naphthalenesulfonic acids with formaldehyde.

The new azolylthiophene compounds of the invention may also be added to or incorporated with the organic materials before or during the shaping of the latter. Thus, they may be added to the moulding composition during the manufacture of films, foils, tapes or shaped structures, or they may be dissolved or finely dispersed in spinning compositions before spinning. The new thiophene compounds of the formula referred to above, especially the oxazolylthiophene compounds, may also be added, before or during the polycondensation, to polyesters or polyamides, or before or during the polymerization of monomers such, for example, as acrylonitrile or vinyl chloride, to the reaction mixtures.

The proportion of new azolylthiophene compound to be used, referred to the material to be optically brightened, may vary within wide limits. Even a very small proportion—in some cases for instance as little as 0.01%—produces a distinct and durable brightening effect. While in general an amount of more than 3% does not prove harmful, it does not offer any advantage over the normal amount either.

The new azolylthiophene compounds may be used as optical brighteners in the following ways:

(a) In admixture with dyestuffs or as additives to dyebaths, printing, discharging or resisting paste; also for after-treating dyeings, prints or discharges.

(b) In admixture with dressing agents, such as starches or synthetic dressings. The products of the invention may also be added, for example, to liquors used to produce anti-crease effects.

(c) In combination with detergents. The detergent and the brightening agent may be added separately to the wash liquor. It is also of advantage to use a detergent which as such already comprises the brightening agent. Suitable detergents are, for example, soaps, salts of sulfonated detergents such for example, as sulfonated benzimidazoles which are substituted by higher alkyl radicals at carbon atom 2; furthermore salts of monocarboxylic acid esters of 4-sulfophthalic acid with higher fatty alcohols; also salts of fatty alcohol sulfonates, alkylarylsulfonic acids or condensation products of higher fatty acids with aliphatic hydroxysulfonic or aminosulfonic acids. There may also be used non-ionic detergents, for example polyglycol ethers derived from ethylene oxide and higher fatty alcohols, alkylphenols or fatty amines.

Unless otherwise indicated, parts and percentages in the following examples are by weight.

Example 1

A mixture of 51 parts of 5-phenylthiophene-2-carboxylic acid, 35 parts of 3:4-diamino-1-methylbenzene and 3 parts of boric acid is heated for 1½ hours at 230° C. under nitrogen, during which water escapes and a homogeneous melt forms. 70 parts by volume of dimethylformamide are then slowly added and from the hot batch the reaction product is precipitated in the form of the hydrochloride by adding 800 parts of 2 N-hydrochloric acid. The batch is suction-filtered, the filter cake is washed with a small amount of water, the product is suspended in 500 parts by volume of dimethylformamide, an excess of ammonium hydroxide is added, and the free base is precipitated from the solution formed by means of water. The precipitate is suctioned off, washed with water and dried, to yield about 58 parts of the compound of the formula (7) 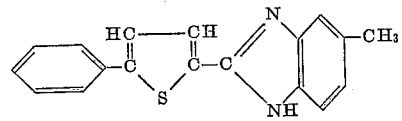

as a light-beige powder melting at 195–196° C. When a specimen of this product is decolorized with active carbon and recrystallized from benzene, it melts at 196.5–197° C.

Analysis.—$C_{18}H_{14}N_2S$, calculated: C, 74.45; H, 4.86; N, 9.65%. Found: C. 74.50; H, 4.88; N, 9.49%.

By an analogous condensation the following new imidazolylthiophene compounds can be prepared:

(8) 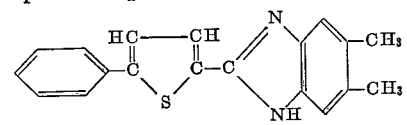

Yellowish, felted small needles from benzene.
Melting point: 235–236° C.

Analysis.—$C_{19}H_{16}N_2S$, calculated: C, 74.97; H, 5.30; N, 9.20%. Found: C, 74.80; H, 5.55; N, 9.04%.

(9) 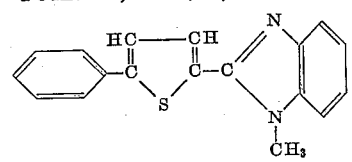

Yellowish flakes from ethyl acetate.
Melting point: 143.5 to 144° C.

Analysis.—$C_{18}H_{14}N_2S$, calculated: C, 74.45; H, 4.86; N, 9.65%. Found: C, 74.23; H, 4.84; N, 9.52%.

The compounds of the Formulae 7, 8 and 9 may be used, for example, for optically brightening polyacrylonitrile and polyamide fibers.

Example 2

68 parts of 5-phenylthiophene-2-carboxylic acid, 40 parts of 1:2-diaminobenzene and 2 parts of boric acid are stirred under nitrogen with 400 parts by volume of diethyleneglycol diethyl ether. The reaction mixture is heated within one hour to 185–190° C., whereupon a clear, dark solution forms and water escapes. The batch is stirred for 1 hour at the same temperature and then considerably evaporated. The temperature of the reaction mixture rises to 220° C. The batch is stirred for about ½ hour longer at 220° C., and after a short cooling time 300 parts of sulfuric acid of 20% strength are added dropwise to the melt which is still diluted with a small proportion of solvent. The precipitate so formed is suctioned off at 20° C. thoroughly expressed and rinsed with a small amount of dilute sulfuric acid. The filter cake is suspended in 1000 parts by volume of hot water, mixed with an excess of ammonia, and the whole is stirred for 1 hour, then suction-filtered and washed with water until the washings run neutral. After drying, there are obtained about 75 parts of the compound of the formula

(10) 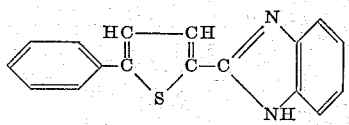

as a light-beige powder melting at 251.5–253° C. On recrystallization from ethanol with addition of active carbon there are obtained colorless needles melting at 255–256° C.

Analysis.—$C_{17}H_{12}N_2S$, calculated: C, 73.88; H, 4.38; N, 10.14%. Found: C, 74.00; H, 4.39; N, 10.27%.

In an analogous manner the following compounds can be manufactured:

(11) 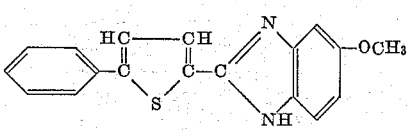

Yellowish flakes from ethanol.
Melting point: 205 to 206° C.

Analysis.—$C_{18}H_{14}N_2OS$, calculated: C, 70.56; H, 4.61; N, 9.14%. Found: C, 70.33; H, 4.67; N, 9.08%.

(12) 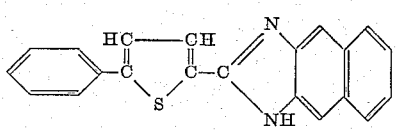

Yellow spangles from ethyl acetate.
Melting point: 228–229° C.

Analysis.—$C_{21}H_{14}N_2S$, calculated: C, 77.27; H, 4.32%. Found: C, 77.17; H, 4.05%.

The compounds of the Formulae 10, 11 and 12 may be used, for example, for optically brightening polyacrylonitrile fibers.

Example 3

81 parts of 5-[2':5'-dichlorophenyl-(1')]-thiophene-2-carboxylic acid, 42 parts of 3:4-diamino-1-methylbenzene and 4 parts of boric acid are stirred under nitrogen with 300 parts by volume of diethyleneglycol diethyl ether. The reaction mixture is heated within one hour to 185–190° C. and then stirred for another hour at this temperature. The bulk of the solvent is then evaporated, with the reaction mixture reaching a temperature of 220° C. The batch is stirred for a short time longer at 220° C., allowed to cool for a short time and 500 parts of sulfuric acid of 20% strength are then dropped into the melt which is diluted with a small amount of solvent. After cooling to room temperature, the precipitate is suctioned off, thoroughly expressed and washed on the filter with a small amount of dilute sulfuric acid. The residue is suspended in 1000 parts by volume of hot water, an excess of ammonium hydroxide is added and the whole is stirred for one hour, then suction-filtered and washed with water until the washings run neutral.

After drying there are obtained about 114 parts of the compound of the formula

(13) 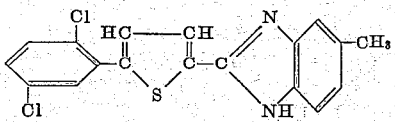

as a beige powder melting at 130 to 132° C. On recrystallization from ethyl acetate+ethanol with addition of active carbon there are obtained colorless flakes melting at 130 to 131.5° C.

Analysis.—$C_{18}H_{12}Cl_2N_2S$, calculated: C, 60.18; H, 3.37; N, 7.80%. Found: C, 59.95; H, 3.31; N, 7.88%.

The following compounds can be manufactured in an analogous manner:

(14) 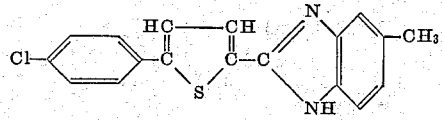

Yellowish needles from ethyl acetate.
Melting point: 262–263° C.

Analysis.—$C_{18}H_{13}ClN_2S$, calculated: C, 66.56; H, 4.03; N, 8.62%. Found: C, 66.67; H, 4.20; N, 8.53%.

(15) 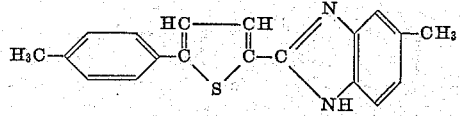

Yellowish, crystalline powder from ethanol+benzene.
Melting point: 257–257.5° C.

Analysis.—$C_{19}H_{16}N_2S$, calculated: C, 74.97; H, 5.30; N, 9.20%. Found: C, 75.06; H, 5.34; N, 9.09%.

(16) 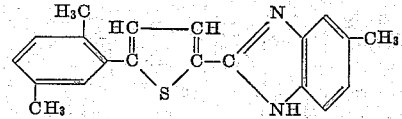

Colorless needles from benzene.
Melting point: 223–224° C.

Analysis.—$C_{20}H_{18}N_2S$, calculated: C, 75.44; H, 5.70; N, 8.80%. Found: C, 75.45; H, 5.70; N, 8.98%.

(17) 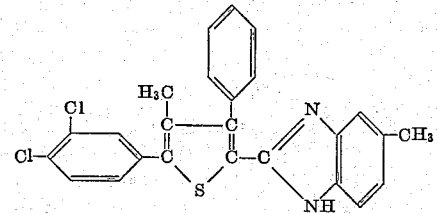

Yellowish needles from ethanol.
Melting point 213–214° C.

Analysis.—$C_{25}H_{18}Cl_2N_2S$, calculated: C, 66.82; H, 4.04; N, 6.23%. Found: C, 66.89; H, 4.03; N, 6.13%.

The compounds of the Formulae 14 and 15 are suitable, for example, as optical brighteners for polyacrylonitrile fibers.

Example 4

A mixture of 63 parts of 5-[4'-chloro-2'-methylphenyl-(1')]-thiophene-2-carboxylic acid, 29 parts of 1:2-diaminobenzene and 4 parts of boric acid is heated for 1½ hours under nitrogen at 230° C. Water escapes and a homogeneous melt forms which is diluted by adding dropwise 150 parts by volume of diethyleneglycol diethyl ether, and the reaction product is then precipitated in the form of the sulfate by dropping in 500 parts by volume of sulfuric acid of 20% strength. The whole is suction-filtered and the filter cake is washed with dilute sulfuric acid and then suspended in 1000 parts by volume of hot water; an excess of ammonium hydroxide is then added and the batch is stirred for 1 hour. After suctioning, washing neutral with water and drying there are obtained about 70 parts of the compound of the formula

(18) 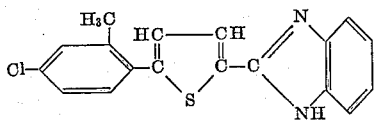

as a bluish powder melting at 243 to 245° C. On recrystallization from ethanol+ethyl acetate with addition of active carbon there are obtained small colorless needles melting at 248-248.5° C. The new compound of the Formula 18 can be used, for example, for optically brightening polyacrylnitrile fibers.

*Analysis.*—$C_{18}H_{13}ClN_2S$, calculated: C, 66.56; H, 4.03; N, 8.62%. Found: C, 66.95; H, 3.92; N, 8.43%.

In an analogous manner the following compounds can be manufactured:

(19) 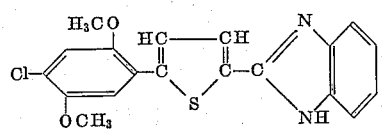

Yellowish needles from methanol+ethyl acetate.
Melting point: 249-250° C.

*Analysis.*—$C_{19}H_{15}ClN_2O_2S$, calculated: C, 61.54; H, 4.08; N, 7.55%. Found: C, 61.56; H, 4.03; N, 7.38%.

(20) 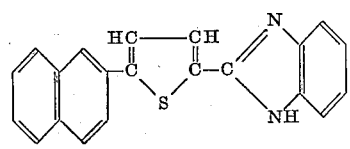

Light-beige needles from ethyl acetate.
Melting point: 251.5-252.5° C.

*Analysis.*—$C_{21}H_{14}N_2S$, calculated: C, 77.27; H, 4.32; N, 8.58%. Found: C, 77.11; H, 4.26; N, 8.57%.

Example 5

A mixture of 10 parts of 5-phenyl-2-[benzimidazolyl-2']-thiophene, 100 parts by volume of acrylonitrile and 6 parts of N:N:N':N'-tetramethyl-diaminobutane is refluxed for 16 hours at the boil. The excess acrylonitrile is then suctioned off under vacuum and the residue is crystallized from ethanol while being clarified with active carbon. There are obtained 8.5 parts of the compound of the formula

(21) 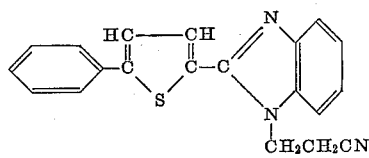

as colorless needles melting at 157-158° C. After recrystallization from ethanol the compound melts at 159-159.5° C. It can be used, for example, for optically brightening polyacrylonitrile fibers.

*Analysis.*—$C_{20}H_{15}N_3S$, calculated: C, 72.92; H, 4.59; N, 12.76%. Found: C, 72.66; H, 4.71; N, 12.70%.

Example 6

6.9 parts of 5-phenyl-2-[benzimidazolyl-2']-thiophene and 4.5 parts of 4-methoxybenzoyl chloride are heated in 10 parts by volume of anhydrous pyridine for 45 minutes at 90 to 100° C. The batch is then stirred with water, the crystalline precipitate is filtered off and washed with water. After drying there is obtained a brown crystalline powder which, after recrystallization from ethanol+ethyl acetate, yields 7 parts of the compound of the formula

(22) 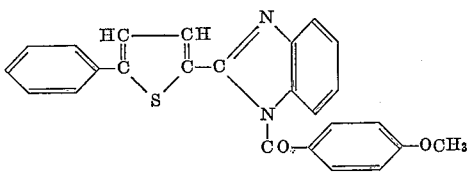

in the form of colorless flakes melting at 158-159° C. The analytically pure product obtained by recrystallization from ethyl acetate+ethanol melts at 160 to 161° C.

*Analysis.*—$C_{25}H_{18}N_2O_2S$, calculated: C, 73.15; H, 4.42; N, 6.82%. Found: C, 73.30; H, 4.46; N, 6.77%.

Example 7

A mixture of 6.9 parts of 5-phenyl-2-[benzimidazolyl-2']-thiophene and 5 parts of powdered potassium hydroxide is dissolved in 30 parts by volume of ethyleneglycol monomethyl ether with heating. In the course of about 15 minutes 6 parts of benzyl chloride are vigorously stirred in drop by drop. The reaction mixture is further heated and refluxed for 20 minutes, then stirred with water, and the precipitate formed is suctioned off at room temperature (about 18° C.) and rinsed with water. The moist filter cake is taken up in hot ethanol and clarified with active carbon. The filtrate is concentrated and water is added until it begins to turn turbid, then allowed to cool and the precipitate is suctioned off, to yield about 6 parts of the compound of the formula

(23) 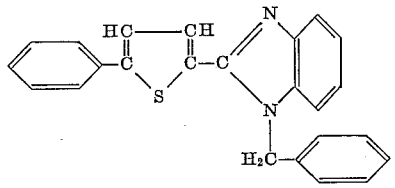

in the form of yellowish needles melting at 218 to 219° C. The analytically pure product obtained by repeated recrystallization from aqueous ethanol melts likewise at 218-219° C.

*Analysis.*—$C_2H_{18}N_2S$, calculated: C, 78.66; H, 4.95; N, 7.64%. Found: C, 78.71; H, 5.02; N, 7.55%.

Example 8

55 parts of the compound of the Formula 10 and 45 parts of para-toluenesulfonic acid ethyl ester in 200 parts by volume of ethylenegylcol are stirred for 4 hours at 110 to 115° C. The initially clear melt turns after some time into a yellow paste which is allowed to cool, suction filtered, and the residue is washed with absolute ethanol. After drying there are obtained about 65 parts of a light-yellow powder melting at 260 to 263° C.

When the crude product is recrystallized from dimethylformamide, there are obtained about 60 parts of the compound of the formula

(24) 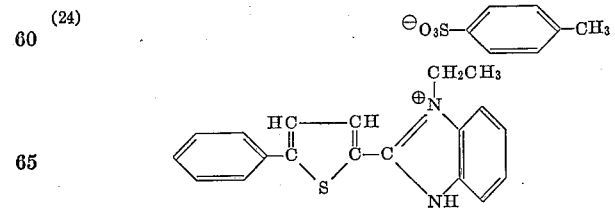

in the form of yellow needles melting at 270-271° C.

Example 9

A mixture of 102 parts of 5-phenylthiophene-2-carboxylic acid, 70 parts of 4-hydroxy-3-amino-1-methylbenzene and 5 parts of boric acid is heated for 1½ hours under nitrogen at 230° C., during which water escapes and a homogeneous melt forms. 100 parts by volume of dimethylformamide are then slowly added and then ethanol is added until the batch begins to turn turbid. The mixture is allowed to cool, the precipitate formed is suctioned off, washed with a small amount of methanol and dried.

There are obtained about 125 parts of the compound of the formula

(25)
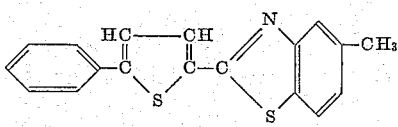

as a beige crystalline powder melting at 150 to 152° C. On recrystallization from benzene+ethanol there are obtained colorless needles melting at 152.5 to 153° C.

*Analysis.*—$C_{18}H_{13}NOS$, caluated: C, 74.20; H, 4.50; N, 4.81%. Found: C, 74.02; H, 4.34; N, 5.13%.

By an analogous condensation the following new oxazolylthiophene compounds can be made:

(26)
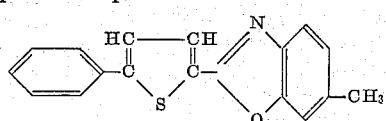

Yellowish needles from ethanol.
Melting point: 154–154.5° C.

*Analysis.*—$C_{18}H_{13}NOS$, calculated: C, 74.20; H, 4.50; N, 4.81%. Found: C, 73.94; H, 4.55; N, 4.66%.

(27)
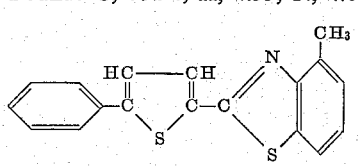

Yellowish crystalline powder from ethanol.
Melting point: 105 to 105.5° C.

*Analysis.*—$C_{18}H_{13}NOS$, calculated: C, 74.20; H, 4.50; N, 4.81%. Found: C, 73.84; H, 4.49; N, 4.84%.

(28)
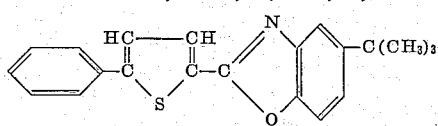

Colorless needles from methanol.
Melting point: 136–137° C.

*Analysis.*—$C_{21}H_{19}NOS$, calculated: C, 75.65; H, 5.74; N, 4.20%. Found: C, 75.60; H, 5.78; N, 3.96%.

(29)
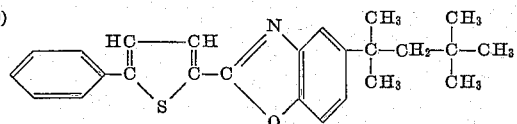

Yellowish needles from benzene+ethanol.
Melting point: 115.5–116.5° C.

*Analysis.*—$C_{25}H_{27}NOS$, calculated: C, 77.08; H, 6.99; N, 3.60%. Found: 77.12; H, 6.97; N, 3.52%.

(30)
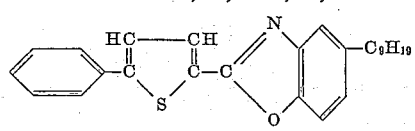

Yellow, viscid oil after repeated chromatography on activated alumina, followed by high-vacuum distillation.

*Analysis.*—$C_{26}H_{29}NOS$, calculated: C, 77.38; H, 7.24; N, 3.47%. Found: C, 77.53; H, 7.35; N, 3.49%.

(31)
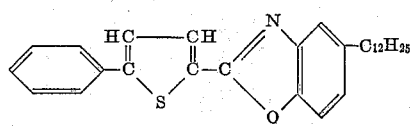

Yellow, viscid oil after repeated chromatography on activated alumina, followed by high-vacuum distillation.

*Analysis.*—$C_{29}H_{35}NOS$, calculated: C, 78.16; H, 7.92; N, 3.14%. Found: C, 78.25; H, 7.98; N, 3.08%.

(32)
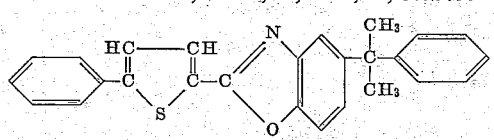

Colorless spangles from ethanol+ethyl acetate.
Melting point: 111 to 112° C.

*Analysis.*—$C_{26}H_{21}NOS$, calculated: C, 78.96; H, 5.35; N, 3.54%. Found: C, 79.26; H, 5.47; N, 3.70%.

(33)
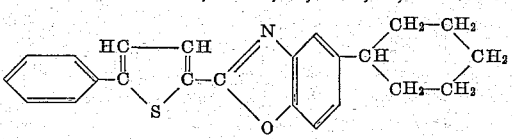

Yellowish crystalline powder from benzene+ethanol.
Melting point: 151.5 to 152° C.

*Analysis.*—$C_{23}H_{20}NOS$, calculated: C, 77.06; H, 5.62; N, 3.91%. Found: C, 77.08; H, 5.92; N, 3.65%.

(34)
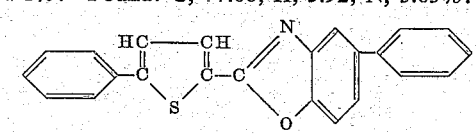

Yellowish spangles from dimethylformamide.
Melting point: 204.5 to 205° C.

*Analysis.*—$C_{23}H_{15}NOS$, calculated: C, 78.16; H, 4.28; N, 3.96%. Found: C, 77.89; H, 4.09; N, 3.96%.

(35)
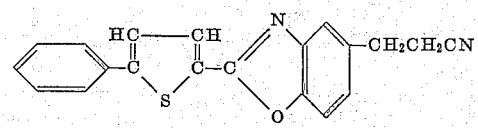

Colorless flakes from ethyl acetate.
Melting point: 151–152° C.

*Analysis.*—$C_{20}H_{14}N_2OS$, calculated: C, 72.70; H, 4.27; N, 8.48%. Found: C, 72.81; H, 4.22; N, 8.54%.

(36)
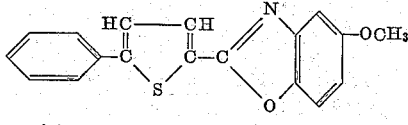

Yellow-greenish crystalline powder from ethanol.
Melting point: 133.5–134° C.

*Analysis.*—$C_{18}H_{13}NO_2S$, calculated: C, 70.34; H, 4.26; N, 4.56%. Found: C, 70.59; H, 4.37; N, 4.54%.

(37)
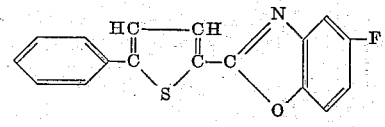

Yellow-greenish flakes from dioxane+ethanol.
Melting point: 182.5–183° C.

*Analysis.*—$C_{17}H_{10}FNOS$, calculated: C, 69.14; H, 3.41; N, 4.74%. Found: C, 68.92; H, 3.46; N, 4.67%.

(38)
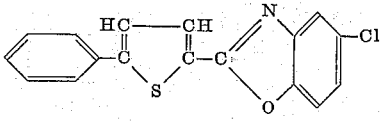

Yellowish, crystalline precipitate from chlorobenzene+ethanol.
Melting point: 184–185° C.

*Analysis.*—C₁₇H₁₀ClNOS, calculated: C, 65.48; H, 3.23; N, 4.49%. Found: C, 65.61; H, 3.22; N, 4.45%.

(39)

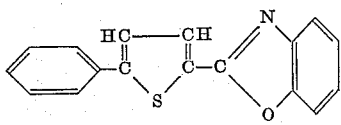

Colorless flakes from ethanol.
Melting point: 146.5–147° C.

*Analysis.*—C₁₇H₁₁NOS, calculated: C, 73.62; H, 4.00; N, 5.05%. Found: C, 73.20; H, 4.05; N, 5.08%.

(40)

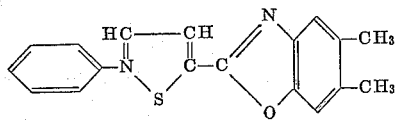

Yellowish needles from dioxane+ethanol.
Melting point: 173.5–174° C.

*Analysis.*—C₁₉H₁₅NOS, calculated: C, 74.72; H, 4.95; N, 4.59%. Found: C, 74.85; H, 4.96; N, 4.41%.

(41)

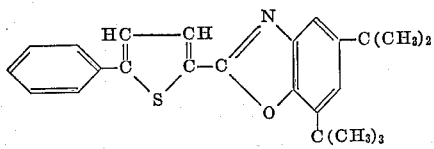

Yellow, viscid oil after repeated chromatography on activated alumina, followed by high-vacuum distillation.

*Analysis.*—C₂₇H₃₁NOS, calculated: C, 77.65; H, 7.48; N, 3.35%. Found: C, 77.94; H, 7.33; N, 3.26%.

(42)

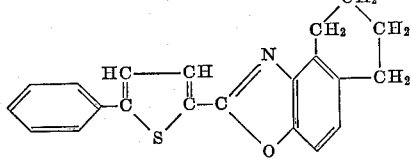

Yellowish prisms from ethyl acetate+ethanol.
Melting point: 131.5–133° C.

*Analysis.*—C₂₁H₁₇NOS, calculated: C, 76.10; H, 5.13; N, 4.23%. Found: C, 75.89; H, 5.13; N, 4.14%.

(43)

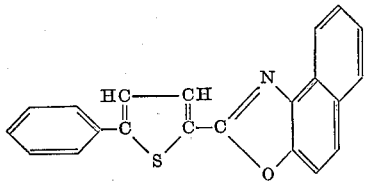

Greenish-yellow crystalline powder from dioxane+ethanol.
Melting point: 151–151.5° C.

*Analysis.*—C₂₆H₂₉NOS, calculated: C, 77.04; H, 4.00; N, 4.28%. Found: C, 77.03; H, 4.03; N, 4.38%.

(44)

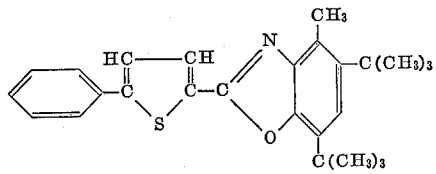

Yellowish flakes from benzene+ethanol.
Melting point: 153–154° C.

*Analysis.*—C₂₆H₂₉NOS, calculated: C, 77.38; H, 7.24; N, 3.47%. Found: C, 77.26; H, 7.16; N, 3.54%.

The compounds of the Formulae 25, 26, 35, 36, 37, 38, 40 and 43 may be used, for example, for optically brightening polyester fibers, the compounds of the Formulae 28, 29, 32, 34 and 39, for example, for optically brightening polyvinyl chloride, and the compounds of the Formulae 31, 33, 41 and 44, for example, for optically brightening polyethylene.

Example 10

A mixture of 51 parts of 5-phenylthiophene-2-carboxylic acid, 40 parts of 4-hydroxy-3-amino-1-n-propylbenzene, 1 part of boric acid and 300 parts by volume of diethyleneglycol diethyl is stirred under nitrogen. The reaction mixture is heated within 1 hour to 185 to 190° C., during which water escapes and a clear, dark solution forms which is stirred for 1 hour at the same temperature; the bulk of the solvent is then evaporated under atmospheric pressure. During this operation the temperature of the reaction mixture rises to about 230° C. The batch is stirred for 30 minutes at about 230° C. and the remainder of the solvent is then expelled under vacuum. The resulting melt is dissolved in ethanol, clarified with active carbon, concentrated and allowed to cool.

After suction-filtration and drying there are obtained about 53 parts of the compound of the formula (45)

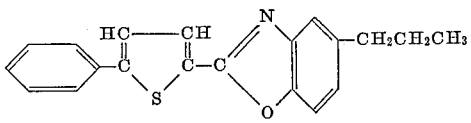

in the form of colorless needles melting at 88–89° C. On recrystallization from ethanol the compound melts at 89–89.5° C.

*Analysis.*—C₂₀H₁₇NOS, calculated: C, 75.20; H, 5.36; N, 4.39%. Found: C, 75.36; H, 5.15; N, 4.30%.

An analogous condensation yields the following compound:

(46)

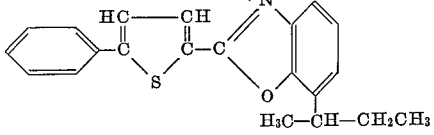

Yellow, viscid oil after repeated chromatography on activated alumina, followed by high-vacuum distillation.

*Analysis.*—C₂₁H₁₉NOS, calculated: C, 75.64; H, 5.74; N, 4.20%. Found: C, 75.50; H, 5.89; N, 3.99%.

Example 11

A mixture of 204 parts of 5-phenylthiophene-2-carboxylic acid and 500 parts by volume of thionyl chloride is refluxed overnight, and the excess thionyl chloride is then suctioned off under vacuum. In the course of 5 minutes 195 parts of 3-[3'-amino-4'-hydroxyphenyl-(1')]-propionic acid methyl ester are then added at 100° C. to the remaining melt. The reaction mixture is heated to 220° C. and stirred at this temperature for 45 minutes. After cooling to 100° C., 50 parts by volume of chlorobenzene are then dropped into the resulting melt, whereupon a dark solution forms which is filtered through 100 parts of activated alumina and the column is rinsed with benzene. The eluate is considerably concentrated and petroleum ether is added, whereupon the reaction product is obtained as a yellowish, crystalline precipitate. The whole is suction-filtered, and the filter cake is washed with petroleum ether and dried, to yield about 130 parts of a compound of the formula (47)

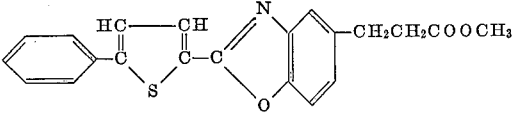

melting at 107–108° C.

On recrystallization from methanol the product forms colorless spangles melting at 109–110° C.

*Analysis.*—C$_{21}$H$_{17}$NO$_3$S, calculated: C, 69.40; H, 4.72; N, 3.85%. Found: C, 69.20; H, 4.75; N, 3.89%.

The new compounds may be used, for example, for optically brightening polyvinyl chloride.

12 parts of sodium hydroxide are dissolved in 100 parts by volume of water and 100 parts by volume of methanol. 6 parts of the compound of the Formula 47 are then added to this methanolic sodium hydroxide solution, and the whole is refluxed for 1 hour. The methanol is then evaportaed under vacuum. On addition of 400 parts by volume of water a clear solution is obtained which is rendered acid to Congo red with hydrochloric acid, the precipitate is suctioned off and washed neutral with water. After drying there are obtained about 6 parts of the compound of the formula

(48)
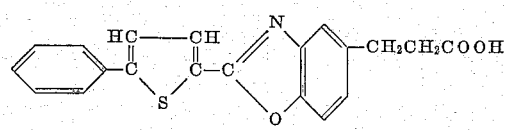

melting at 198–200° C.

After recrystallization from ethanol the product forms colorless needles melting at 199–200° C.

*Analysis.*—C$_{20}$H$_{15}$NO$_3$S, calculated: C, 68.75; H, 4.33; N, 4.01%. Found: C, 68.76; H, 4.25; N, 4.05%.

Example 12

A mixture of 81 parts of 5-[2':5'-dichlorophenyl-(1')]-thiophene-2-carboxylic acid, 64 parts of 3-amino-4-hydroxy-1-phenylbenzene and 4 parts of boric acid is heated under nitrogen for 1½ hours at 220° C., during which water escapes and a homogeneous melt forms which solidifies on cooling. It is dissolved in benzene, the benzene solution is filtered through 100 parts of activated alumina, and the alumina column is rinsed with benzene. The liquor is then considerably concentrated; on addition of cyclohexane the reaction product of the formula

(49)
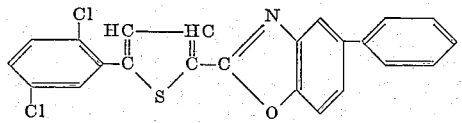

precipitates as a grey powder melting at 135 to 137° C.; Yield: about 84 parts.

On recrystallization from ethyl acetate+ethanol a colorless, crystalline powder is obtained which melts at 135–137° C.

*Analysis.*—C$_{23}$H$_{13}$Cl$_2$NOS, calculated: C, 65.41; H, 3.10; N, 3.32%. Found: C, 65.38; H, 3.04; N, 3.14%.

By an analogous condensation the following new compounds can be prepared:

(50)
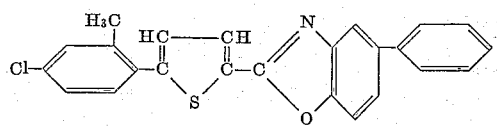

Colorles flakes from ethyl acetate+ethanol.
Melting point: 140–141° C.

*Analysis.*—C$_{24}$H$_{16}$ClNOS, calculated: C, 71.72; H, 4.01; N, 3.48%. Found: C, 71.81; H, 3.94; N, 3.35%.

(51)
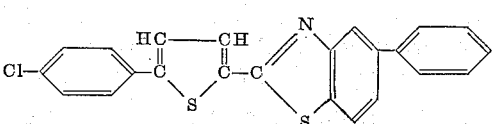

Yellowish spangles from dioxane.
Melting point: 202–202.5° C.

*Analysis.*—C$_{23}$H$_{14}$ClNOS, calculated: C, 71.22; H, 3.64; N, 3.61%. Found: C, 71.06; H, 3.57; N, 3.31%.

(52)
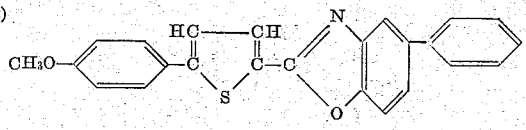

Yellowish spangles from ethyl acetate+ethanol.
Melting point: 178–179° C.

*Analysis.*—C$_{24}$H$_{17}$NO$_2$S, calculated: C, 75.17; H, 4.47; N, 3.65%. Found: C, 75.14; H, 4.50; N, 3.48%.

(53)
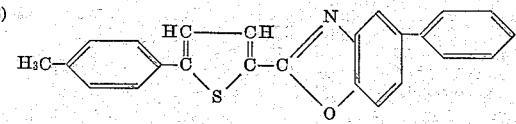

Light-beige needles from ethyl acetate.
Melting point: 170–180° C.

*Analysis.*—C$_{24}$H$_{17}$NOS, calculated: C, 78.46; H, 4.66; N, 3.18%. Found: C, 78.25; H, 4.59; N, 3.68%.

(54)
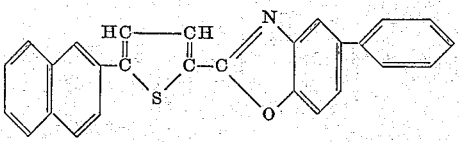

Greyish flakes from ethyl acetate.
Melting point: 216–217° C.

*Analysis.*—C$_{27}$H$_{17}$NOS, calculated: C, 80.37; H, 4.25; N, 3.47%. Found: C, 80.51; H, 4.30; N, 3.42%.

(55)
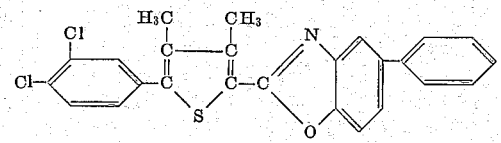

Greyish spangles from benzene+ethanol.
Melting point: 218–219° C.

*Analysis.*—C$_{25}$H$_{17}$Cl$_2$NOS, calculated: C, 66.67; H, 3.80; N, 3.11%. Found: C, 66.50; H, 3.96; H, 3.06%.

(56)
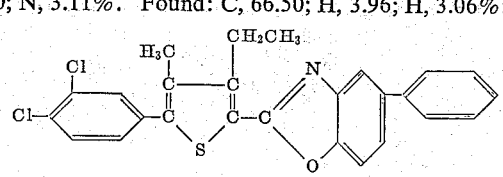

Colorless needles from ethanol.
Melting point: 124–125° C.

*Analysis.*—C$_{26}$H$_{19}$Cl$_2$NOS, calculated: C, 67.2; H, 4.12; N, 3.02%. Found: C, 67.08; H, 4.20; N, 2.83%.

(57)
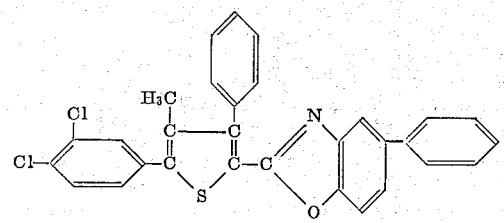

Colorless spangles from glacial acetic acid+ethanol.
Melting point: 167–167.5° C.

*Analysis.*—C$_{30}$H$_{19}$Cl$_2$NOS, calculated: C, 70.31; H, 3.74; N, 2.73%. Found: C, 70.38; H, 3.77; N, 2.72%.

Example 13

A mixture of 33 parts of 5-[4'-chloro-2':5'-dimethoxy-(1')]-thiophene-2-carboxylic acid, 20 parts of 3-amino-4-hydroxy-1-tertiary butylbenzene and 2 parts of boric acid is heated under nitrogen for 1½ hours at 220° C., during which water escapes and a homogeneous melt forms. After cooling, the melt is pulverized and crystallized from methylene chloride+ethanol, to yield about 40 patrs of the compound of the formula

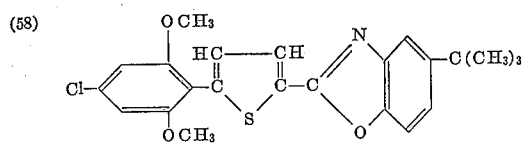

as colorless needles melting at 165–166° C.

*Analysis.*—$C_{23}H_{22}ClNO_3S$, calculated: C, 64.55; H, 5.18; N, 3.27%. Found: C, 64.39; H, 4.98; N, 3.06%.

Example 14

A mixture of 37 parts of 5-[3':4'-dichlorophenyl-(1')]-thiophene-2-carboxylic acid, 20 parts of 3-amino-4-hydroxy-1-methylbenzene and 3 parts of boric acid is heated under nitrogen for 1½ hours at 220° C., during which water escapes and a homogeneous melt forms. This melt is pulverized and crystallized from ethanol, to yield about 40 parts of the compound of the formula

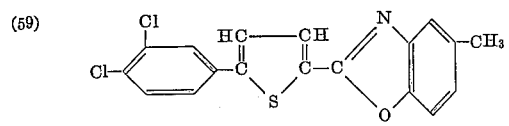

as yellowish spangles melting at 160 to 162° C. After recrystallization from dioxane the product melts at 163 to 164° C.

*Analysis.*—$C_{18}H_{11}Cl_2NOS$, calculated: C, 60.01; H, 3.08; N, 3.89%. Found: C, 59.90; H, 3.08; N, 3.67%.

Example 15

A mixture of 51 parts of 5-phenylthiophene-2-carboxylic acid, 30 parts of ortho-aminothiophenol and 3 parts of boric acid is heated under nitrogen for 1 hour at 230° C. The melt which solidifies on cooling is dissolved in methylene chloride, the solution is filtered through activated alumina and rinsed with methylene chloride, evaporated to dryness, and 20 parts of a brown residue are obtained. Crystallization from methanol with addition of active carbon furnishes the compound of the formula

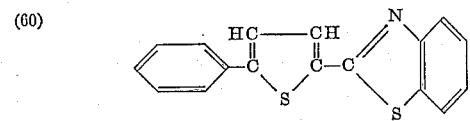

as yellow-greenish needle melting at 150–151° C. After recrystallization from ethanol the product melts at 152–163° C.

*Analysis.*—$C_{17}H_{11}NS_2$, calculated: C, 69.59; H, 3.78; N, 4.77%. Found: C, 69.86; H, 3.74; N, 4.90%.

The new compound of the Formula 60 is suitable, for example, for optically brightening polyester fibers.

Example 16

50 parts of polyacrylonitrile fiber fabric are treated for 30 minutes at 85–95° C. in a bath prepared from 1500 parts of water
2 parts of formic acid of 85% strength
0.01 part of the imidazole compound of the Formula 7 and then rinsed and dried. The material treated in this manner is whiter than a material treated without addition of the imidazole compound.

A similar effect is achieved when the imidazole compound of the Formula 8 is used.

Example 17

100 parts of a polyacrylonitrile fabric are immersed at 60° C. in a bath consisting of 4000 parts of water
4 parts of formic acid of 85% strength
8 parts of a non-ionic dispersant (condensation product of 1 mol of octadecyl alcohol and 35 mols of ethylene oxide) and
0.05 part of the imidazolylthiophene compound of the Formula 9.

The bath is then raised to the boil within 20 minutes, the fabric is treated for ½ hour at the boil, the bath is then cooled to 70° C., and the fabric is rinsed and dried.

The material treated in this manner has a substantially higher white content than the untreated fabric.

Similar brightening effects are obtained by using instead of the imidazolylthiophene compound of the Formula 9 one of the compounds of the Formulae 10, 14, 15, 18, 21, 22 or 23.

Example 18

100 parts of a fabric of polyester fibers prepared from terephthalic acid and ethylene glycol (for example Terylene) are treated for 1 hour at 60 to 90° C. in a bath of the following composition:

3000 parts of water
6 parts of formic acid of 85% strength
0.7 part of the oxazole compound of the Formula 40 and then rinsed and dried.

The material so treated has a higher white content than material treated in similar manner, but without addition of the oxazole compound.

Example 19

100 parts of a polyester fabric (for example Dacron) are immersed at 60° C. in a bath consisting of 4000 parts of water
4 parts of Glauber's salt
8 parts of dispersant (adduct of 35 mols of ethylene oxide and 1 mol of octadecyl alcohol)
0.1 part of the oxazole compound of the Formula 26.

The bath is then raised to the boil and the fabric is treated for 40 minutes at the boil. The fabric is then rinsed and dried.

The polyester fabric thus treated has a substantially higher white content than the untreated material.

Similar brightening effects are obtained by using instead of the compound of the Formula 26 any one of the compounds of the Formulae 25, 32, 35, 36, 37, 38, 39, 40, 42, 45, 47, 49, 50, 52, 53 or 60.

Example 20

100 parts of polyamide fabric (for example spun nylon) are immersed at 60° C. in a bath consisting of 4000 parts of water
8 parts of dispersant (adduct of 35 mols of ethylene oxide and 1 mol of octadecyl alcohol) and
0.1 part of the oxazolylthiophene compound of the Formula 40.

The bath is then heated within 15 minutes to 95° C. and maintained at this temperature for 30 minutes, whereupon the fabric is rinsed and dried.

The fabric thus treated has a higher white content than the untreated material.

Similar brightening effects are obtained by using instead of the compound of the Formula 40 a compound of one of the Formulae 7, 8, 11, 36, 51, 54 or 60.

Example 21

A soap (sodium salt of higher fatty acids) is prepared which contains 0.5% of the compound of the Formula 11 or 0.5% of the compound of the Formula 19.

Acetate rayon or cotton washed with this soap for 30 minutes at 60° C. has a lighter aspect than material washed with a soap that does not contain the compound for the Formula 11 or 19.

Example 22

100 parts of polyethylene are rolled on a calender heated at 130° C. until a homogeneous foil is obtained. In this foil there are then slowly incorporated 0.2 part of the compound of the Formulae 28, 29, 31, 32, 33, 39, 41, 42 or 44 and 0.5 part of titanium dioxide. The foil is pulled off the calender and then pressed between steel plates heated at 130 to 135° C. to smooth both surfaces of the foil.

The opaque polyethylene foils obtained in this manner have a substantially higher white content than foils not containing the thiophene derivatives.

Example 23

An intimate mixture of 100 parts of polyvinyl chloride, 2 parts of titanium dioxide, 54 parts by volume of dioctyl phthalate and 0.2 part of the compound of the Formulae 25, 26, 28, 29, 32, 34, 36, 37, 38, 39, 40, 42, 45, 47, 51, 52 or 53 is rolled on a calender heated at 140 to 150° C. to produce a foil.

The opaque polyvinyl chloride foils obtained in this manner have a substantially higher white content than comparable foils not containing the thiophene derivatives.

Example 24

A solution of 15% strength of polyacrylonitrile in dimethylformamide (which contains, calculated from polyacrylonitrile, 0.1% of the compound of the Formula 10 in solution) is used to manufacture a film 0.5 mm. thick which is then dried for 15 minutes at 120° C. The film obtained in this manner displays a distinct brightening effect.

Example 25

A solution of 0.05 to 0.1 part of the compound of the Formula 11 in acetone or dimethylformamide is added to an acetylcellulose spinning solution prepared from 10 parts of acetylcellulose (2½-acetate) and 300 parts of acetone. The mixture is thoroughly stirred and filaments are then spun from it in the conventional manner.

The filaments thus obtained have a substantially higher white content than comparable filaments that do not contain the compound of the Formula 11.

Example 26

100 parts of polyester granulate from polyterephthalic acid ethyleneglycol ester are intimately mixed with 0.05 to 0.1 part of the compound of the Formula 60 and melted at 285° C. while being stirred. When this spinning composition is spun through usual spinnerets, substantially brightened polyester fibers are obtained.

Similar brightening effects are obtained by using instead of the compound of the Formula 60 a compound of Formulae 25, 26, 36, 37, 38, 40, 52 or 53.

Example 27

10,000 parts of a polyamide prepared in known manner from hexamethylene diamine adipate, in chip form, are mixed in a tumbler for 12 hours with 30 parts of titanium dioxide (rutile modification) and 10 parts of the compound of the Formula 48. The chips so treated are melted in a boiler heated with oil or diphenyl vapour to 300 to 310° C., after having displaced the atmospheric oxygen by means of superheated steam, and then stirred for ½ hour. The melt is then expressed under a nitrogen pressure of 5 atmospheres through a spinneret, and the resulting, cooled filament is wound on a spinning bobbin. The filaments thus obtained display a brightening effect of excellent stability to thermofixation which has good fastness to washing and light.

A similar brightening effect is achieved by using instead of the compound of the Formula 48 a compound of the Formulae 7, 8, 32, 34, 35, 36, 37, 38, 42, 47, 51, 53, 59 or 60.

Example 28

51 parts of 5-phenylthiophene-2-carboxylic acid, 40 parts of 4-hydroxy-3-aminobenzene-1-carboxylic acid methyl ester and 2 parts of boric are stirred under nitrogen with 150 parts by volume of diethyleneglycol diethyl ether. In the course of one hour the batch is heated to 185–190° C., whereupon a turbid, dark solution forms and water escapes. The reaction mixture is stirred for 1 to 2 hours at this temperature, and the solvent is then slowly evaporated. The reaction mixture forms a turbid, dark melt which is stirred for 2 hours at 260° C., then allowed to cool, the solidified melt is dissolved in 1000 parts by volume of hot dimethylformamide, the undissolved residue is filtered off, the filtrate is strongly concentrated and the reaction product is precipitated with methanol. After cooling, the precipitate is suctioned off, thoroughly expressed and the filter cake is washed with methanol.

The residue is recrystallized from dioxane, to yield about 50 parts of a light-beige powder of the formula (61)

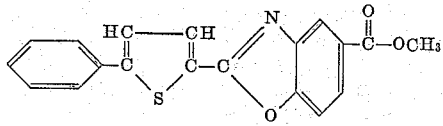

melting at 178 to 180° C. Repeated recrystallization from dioxane and clarification with active carbon furnishes small, substantially colorless needles melting at 194–195° C.

$C_{19}H_{13}NO_3S$, calculated: C, 68.04; H, 3.91; N, 4.18%. Found: C, 67.95; H, 3.96; N, 4.11%.

A mixture of 33.5 parts of the compound of the Formula 61, 40 parts of sodium hydroxide, 100 parts of water and 400 parts by volume of ethanol is refluxed for 24 hours, then diluted with 500 parts of water, and the ethanol is suctioned off under vacuum. The batch is acidified, the precipitate is filtered off and the filtrate is washed with water until it gives a neutral reaction. Yield: about 27 parts of a brown powder. The product of the formula (62)

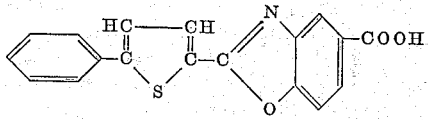

is obtained on repeated recrystallization from dichlorobenzene as a yellowish powder melting at 281 to 283° C.

$C_{18}C_{11}NO_3S$, calculated: C, 67.28; H, 3.45; H, 4.36%. Found: C, 67.26; H, 3.50; N, 4.34%.

Example 29

30 parts of 5-(4'-methoxyphenyl)-thiophene-2-carboxylic acid are refluxed for 12 hours with 100 parts of thionyl chloride, during which hydrochloric acid gas escapes and a clear solution is formed. The excess thionyl chloride is then evaporated under vacuum. The residual acid chloride is dissolved in 400 parts by volume of dry xylene, 21.4 parts of finely comminuted 4-hydroxy-3-aminobenzoic acid methyl ester are added at room temperature and the mixture is raised to the reflux temperature, which causes hydrochloric acid to escape. After having been refluxed for 24 hours the batch is allowed to cool, suction-filtered, and the residue is washed with methanol and dried, to yield about 37 parts of a light-beige powder of the formula (63)

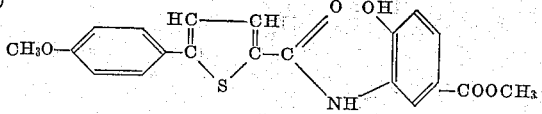

melting at 258 to 260° C.

37 parts of the compound of the Formula 63 are triturated with 1.5 parts of boric acid and heated for 1 hour at 230 to 240° C. under nitrogen, whereupon water escapes and a dark melt forms which is allowed to cool, the solid melt is dissolved in methylene chloride, filtered through 200 parts of active alumina and rinsed with methylene chloride. The batch is evaporated to dryness and the residue crystallized from acetone and dried, to yield about 16 parts of the compound of the formula

(64) 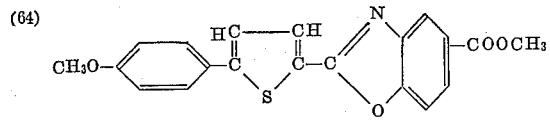

in the form of small, pale-yellow needles melting at 179 to 180° C. The analytically pure product obtained by distillation under a high vacuum melts at 184 to 185° C.

$C_{20}H_{15}NO_4S$, calculated: C, 65.74; H, 4.14; N, 3.83%. Found: C. 65.44; H, 4.04; N, 3.75%.

6.7 parts of the compound of the Formula 64 are refluxed for 2 hours with a solution of 2.2 parts of sodium hydroxide in 50 parts of water and 50 parts by volume of methanol, whereupon a thickly liquid, pale-yellow suspension is obtained which is suction-filtered. The residue is washed with water, suspended in 150 parts by volume of dimethylformamide, acidified with dilute acetic acid, and the light-yellow precipitate is suctioned off and washed with water until the washings run neutral. On recrystallization from a large quantity of acetone there are obtained about 4 parts of a light-yellow crystalline powder of the compound of the formula

(65) 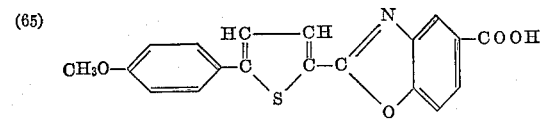

which melts at 291 to 292° C. The analytically pure product obtained by sublimation in a high vacuum melts at 293 to 294° C.

$C_{19}H_{13}NO_4S$, calculated: C, 64.95; H, 3.73; N, 3.99%. Found: C, 64.64; H, 3.62; N, 4.21%.

*Example 30*

A mixture of 4 parts of 5-(4'-methylphenyl)-thiophene-2-carboxylic acid and 20 parts by volume of thionyl chloride is refluxed for 12 hours, during which hydrochloric acid gas escapes and a clear solution is formed. The excess thionyl chloride is then evaporated under vacuum. The yellow residue is dissolved in 100 parts by volume of dry xylene and 3.1 parts of 4-hydroxy-3-amino-1-benzoic acid methyl ester are added. The batch is raised to the reflux temperature, with hydrochloric acid gas escaping. After 18 hours the evolution of hydrochloric acid ceases. The reaction mixture is cooled to room temperature, suction-filtered and the filter cake is washed with methanol.

After drying there are obtained about 4 parts of the compound of the formula

(66) 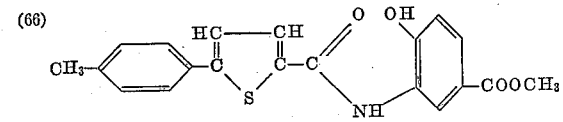

as a light-brown powder melting at 274 to 276° C.

4 parts of the compound of the Formula 66 are mixed with 0.2 part of boric acid and 3 parts by volume of triethyleneglycol dimethyl ether, and the whole is heated under nitrogen for 1½ hours at 230 to 235° C., whereupon a dark solution forms which is allowed to cool and diluted with a small amount of methanol. The batch is suction-filtered and the residue is dried, to yield about 2 parts of the compound of the formula

(67) 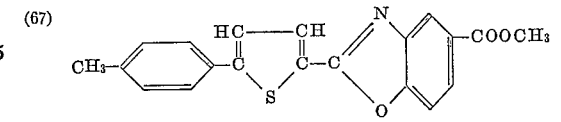

in the form of a light-beige powder melting at 168–170° C. On recrystallization from toluene+methanol and clarification with active carbon there are obtained small, colorless needles melting at 175–176° C.

$C_{20}H_{15}NO_3S$, calculated: C, 68.75; H, 4.33; N, 4.01%. Found: C, 68.74; H, 4.34; N, 4.14%.

When 5-(4'-methylphenyl)-thiophene-2-carboxylic acid is replaced by an equivalent amount of 5-(4'-chloro-2':5'-dimethoxy)-thiophene-2-carboxylic acid and the condensation is performed in identical manner, the compound of the formula

(68) 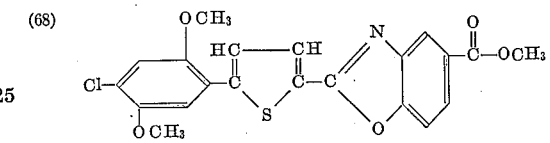

is obtained on recrystallization from dioxane in a similar yield and purity in the form of small yellow needles melting at 228 to 229° C.

$C_{21}H_{16}NO_5SCl$, calculated: C, 58.68; H, 3.75; N, 3.26%. Found: C, 58.24; H, 3.76; N, 3.28%.

*Example 31*

A mixture of 9.6 parts of the compound of the Formula 62 and 30 parts by volume of thionyl chloride is refluxed for 12 hours, during which hydrochloric acid gas escapes and a solution forms. The excess thionyl chloride is then evaporated under vacuum. 30 parts by volume of dry pyridine are added to the solid residue and while cooling the resulting suspension 4.5 parts of morpholine are dropped in; the batch is then heated for 3 hours at the boil, allowed to cool, diluted with 50 parts by volume of methanol, suction-filtered, and the residue is rinsed with methanol. Two recrystallizations from ethanol and clarification with active carbon furnish about 7.2 parts of the compound of the formula

(69) 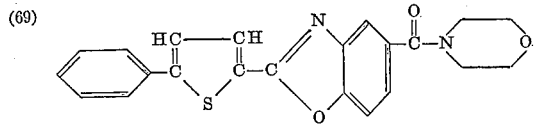

in the form of yellowish tensel melting at 189.5 to 190.5° C.

$C_{22}H_{18}N_2O_3S$, calculated: C, 67.67; H, 4.65; N, 7.17%. Found: C, 67.38; H, 4.83; N, 7.26%.

When morpholine is replaced by an equimolecular quantity of aniline and the condensation is carried out in identical manner, the compound of the formula

(70) 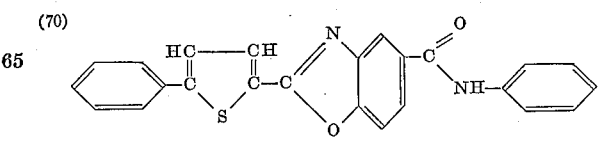

is obtained on recrystallization from dioxane in an approximately equal purity and yield in the form of colorless flakes melting at 240 to 241° C.

$C_{24}H_{16}N_2O_2S$, calculated: C, 72.71; H, 4.07; N, 7.07%. Found: C, 72.62; H, 3.96; N, 6.96%.

When the condensation is performed with 4-chloro-

2:5 dimethoxyaniline instead of with morpholine, the compound of the formula

(71)
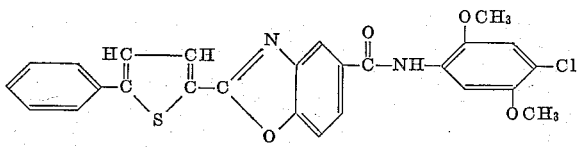

is obtained on recrystallization from benzene in the form of a colorless crystalline powder melting at 200 to 201° C.

$C_{26}H_{19}N_2O_4SCl$, calculated: C, 63.61; H, 3.90; N, 5.71%. Found: C, 63.79; H, 3.86; N, 5.61%.

An alternative condensation with 1-hydroxy-2-aminoethane yields on recrystallization from ethanol the compound of the formula

(72)
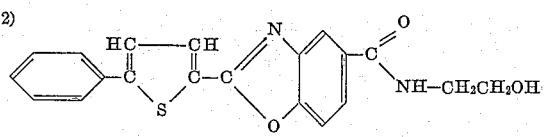

as a colorless crystalline precipitate melting at 217.5 to 218° C.

$C_{20}H_{16}N_2O_3S$, calculated: C, 65.92; H, 4.63; N, 7.69%. Found: C, 65.91; H, 4.61; N, 7.85%.

Condensation with allylamine gives rise to the compound of the formula

(73)
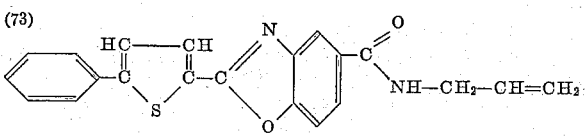

which on recrystallization from dioxane forms yellowish prisms melting at 222 to 223° C.

$C_{21}H_{16}N_2O_2S$, calculated: C, 69.98; H, 4.47; N, 7.77%. Found: C, 69.71; H, 4.50; N, 7.91%.

*Example 32*

10 parts of the compound of the Formula 62 are refluxed with 30 parts by volume of thionyl chloride until hydrochloric acid gas is no longer being evolved. The excess thionyl chloride is evaporated under vacuum, the solid residue is dissolved in 75 parts by volume of dry methylene chloride and while stirring the whole ammonia gas is introduced, whereupon the amide precipitates as a fine powder. The whole is evaporated to dryness, and the residue is comminuted and extracted by being boiled with water. Crystallization from dioxane+ethyl acetate furnishes about 8 parts of the compound of the formula

(74)
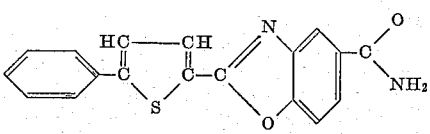

in the form of a light-beige crystalline powder melting at 238 to 240° C. The analytically pure product obtained by another recrystallization from dioxane+ethyl acetate melts at 239 to 241° C.

$C_{18}H_{12}N_2O_2S$, calculated: C, 67.48; H, 3.78; N, 8.74%. Found: C, 67.51; H, 4.02; N, 8.94%.

*Example 33*

32 parts of the compound of the Formula 62 are refluxed for 12 hours with 100 parts by volume of thionyl chloride, during which hydrochloric acid gas escapes and a solution forms. The excess thionyl chloride is then evaporated under vacuum and the solid residue is stirred with 100 parts by volume of dry pyridine. While cooling the batch, 10 parts of allyl alcohol are then dropped in and the reaction mixture is stirred for 2 hours at 100° C., allowed to cool, poured into water, the brown precipitate is filtered off and rinsed with water. After drying, the reaction product is dissolved in methylene chloride, filtered through 400 parts of active alumina, and the filter residue is rinsed with methylene chloride. After considerable concentration the product is precipitated from the eluate by adding methanol. After drying there are obtained about 28 parts of the compound of the formula

(75)
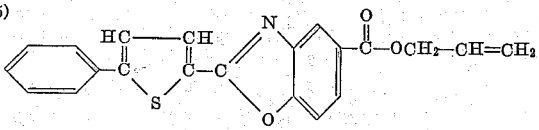

as a yellow, crystalline precipitate melting at 151 to 152° C. Crystallization from cyclohexane furnishes yellowish, small needles melting at 155.5 to 156.5° C.

$C_{21}H_{15}NO_3S$, calculated: C, 69.79; H, 4.18; N, 3.88%. Found: C, 70.10; H, 4.34; N, 3.90%.

When allyl alcohol is replaced by benzyl alcohol and the condensation is performed similarly, the compound of the formula

(76)
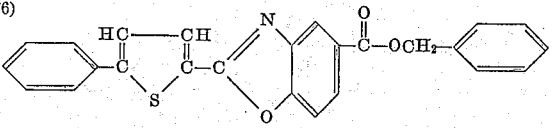

is obtained in an approximately equal yield and purity as a colorless, crystalline powder melting at 167 to 168° C. from acetone.

$C_{26}H_{17}NO_3S$, calculated: C, 72.97; H, 4.16; N, 3.40%. Found: C, 72.88; H, 4.30; N, 3.45%.

An alternative condensation with 4-hydroxy-1-methylbenzene yields the compound of the formula

(77)
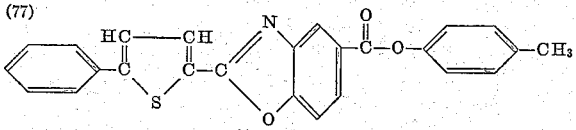

which is obtained from chlorobenzene+alcohol in small, colorless needles melting at 207.5 to 208.5° C.

$C_{25}H_{17}NO_3S$, calculated: C, 72.97; H, 4.16; N, 3.40%. Found: C, 72.71; H, 4.08; N, 3.43%.

When the condensation is carried out with 2-hydroxypropane, the compound of the formula

(78)
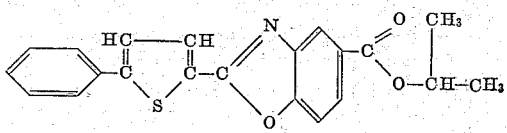

is obtained in the form of a yellowish, crystalline powder melting at 141.5 to 142° C.

$C_{21}H_{17}NO_3S$ calculated: C, 69.40; H, 4.72; N, 3.85%. Found: C, 69.52; H, 4.66; N, 3.85%.

Condensation with 1-hydroxy-2-ethylhexane gives rise to the compound of the formula

(79)
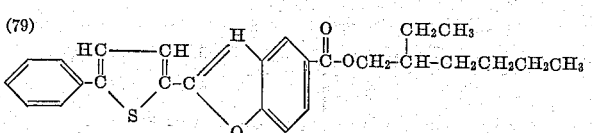

in the form of a colorless, crystalline powder melting at 147 to 148° C.

$C_{26}H_{27}NO_3S$ calculated: S, 72.03; H, 6.27; N, 3.23%. Found: S, 71.88; H, 5.93; N, 3.51%.

When the condensation is carried out with 1-hydroxyhexadecane, there is obtained the compound of the formula

(80) 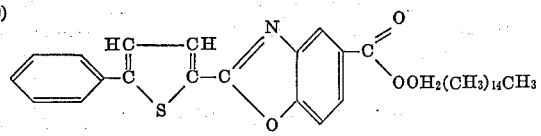

as a colorless, crystalline powder melting at 106 to 108° C.

$C_{34}H_{43}NO_3S$ calculated: C, 74.82; H, 7.84; N, 2.57%.
Found: C, 74.78; H, 7.99; N, 2.52%.

Condensation with diethyleneglycol mono-n-butyl ether gives rise to the compound of the formula

(81) 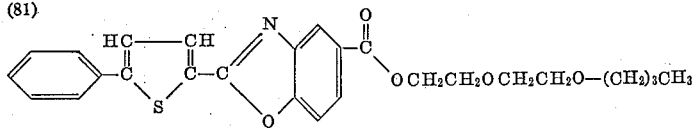

in the form of a colorless, waxy precipitate from methylene chloride+petroleum ether.

$C_{26}H_{27}NO_5S$ calculated: C, 67.08; H, 5.85; N, 3.01%.
Found: C, 67.01; H, 5.86; N, 2.98%.

Example 34

A mixture of 0.95 part of calcium hydroxide in 500 parts of water with 8 parts of finely ground compound of the Formula 62 is stirred for 6 hours at 80 to 85° C. The batch is then allowed to cool, suction-filtered at room temperature and the filter residue is thoroughly washed with water. Any free carboxylic acid left is removed by stirring with 200 parts by volume of boiling dioxane for a short time. The hot residue is suctioned off and washed with a small amount of hot dioxane.

After drying, there are obtained about 7.9 parts of the compound of the formula

(82) 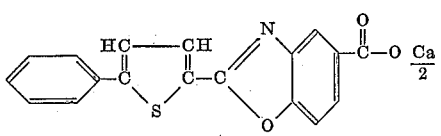

as a yellowish powder which does not melt below 320° C.

Example 35

An intimate mixture of 100 parts of a polyester granulate of polyterephthalic acid ethyleneglycol ester and 0.05 to 0.1 part of the compound of the Formula 62 is melted at 285° C. while being stirred. When this spinning composition in spun through conventional spinnerets, considerably brightened polyester fibers are obtained.

If desired, the compound of the Formula 62 may alternatively be added to the reaction mixture which yields the polyester before or during the polycondensation.

Similar brightening effects are achieved by using instead of the compound of the Formula 62 one of the compounds of the Formulae 61, 64, 65 or 67 to 82.

Example 36

10,000 parts of a polyamide in chip form, prepared in known manner from hexamethylenediamine adipate, are mixed with 30 parts of titanium dioxide (rutile modification) and 10 parts of the compound of the Formula 62 for 12 hours in a tumbler. The chips treated in this manner are freed from atmospheric oxygen by means of superheated steam, then melted in a boiler heated with oil vapour or diphenyl vapour at 300 to 310° C., and stirred for half an hour. The melt is then expressed through a spinneret under a nitrogen pressure of 5 atmospheres (gauge), and the resulting filament is allowed to cool and then wound on a spinning bobbin. The filaments obtained in this manner display an excellent brightening effect which is fast to heat-setting and has good fastness to washing and light.

Alternatively, the compound of the Formula 62 can be added to the reaction mixture before or during the polycondensation that gives rise to the polyamide.

When the compound of the Formula 62 is replaced by the compound of the Formulae 61, 64, 65 or 67 to 82, similar brightening effects are obtained.

What is claimed is:

1. An azolyl-thiophene compound of the formula

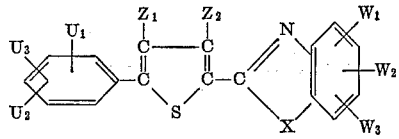

wherein $U_1$ and $U_2$ each represents a member selected from the group consisting of hydrogen, halogen, an alkyl group with 1 to 4 carbon atoms and an alkoxy group with 1 to 4 carbon atoms, $U_3$ is selected from the group consisting of hydrogen and an alkoxy group of from 1 to 4 carbon atoms, $W_1$ is a member selected from the group consisting of alkyl, phenylalkyl, alkoxy, cyanoalkyl, carboxyalkyl, carboalkoxyalkyl, each of which contains up to 12 carbon atoms, hydrogen, halogen, phenyl, cyclohexyl, carboxyl, carboxylic acid alkyl ester with 1 to 16 carbon atoms in the alkyl group, carboxylic acid benzyl ester group, carboxylic acid allylester, a carboxylic acid phenylester group, carboxylic acid amide group,

—CO—NH—CH$_2$—CH$_3$

—CH—NH—CH$_2$—CH$_2$OH

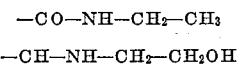

—CO—NH—⟨phenyl⟩

—CO—NH—⟨phenyl⟩—CH$_3$

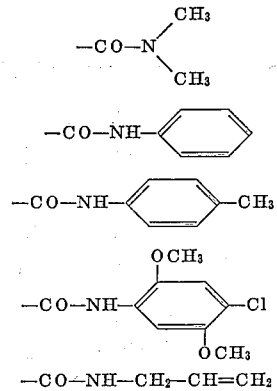

—CO—NH—CH$_2$—CH=CH$_2$ and

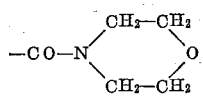

$W_2$ and $W_3$ together are members selected from the group consisting of (a) two hydrogen atoms, (b) two alkyl groups with 1 to 4 carbon atoms, (c) a hydrogen atom and an alkyl group with 1 to 4 carbon atoms and (d) with two vicinal carbon atoms of the benzene ring the group of the formula

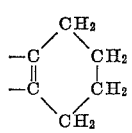

X is a member selected from the group consisting of

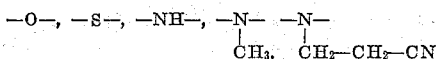
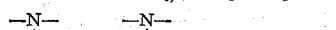
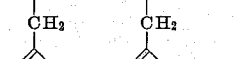
and
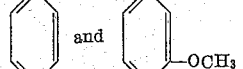

$Z_1$ and $Z_2$ each is a member selected from the group consisting of hydrogen, alkyl with 1 to 7 carbon atoms and phenyl.

2. The compound of the formula

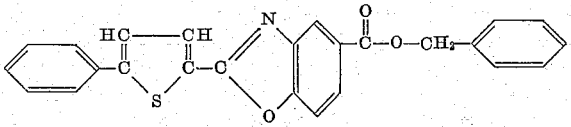

3. The thiazolyl-thiophene compound of the formula

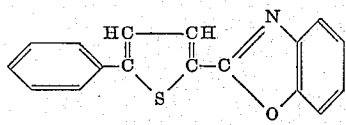

4. The imidazylthiophene compound of the formula

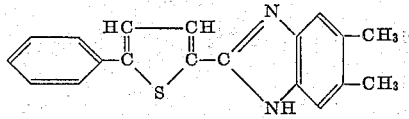

5. The imidazylthiophene compound of the formula

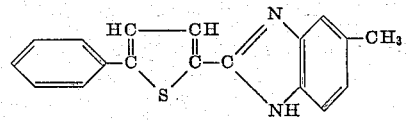

6. The imidazylthiophene compound of the formula

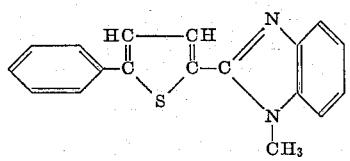

7. The imidazylthiophene compound of the formula

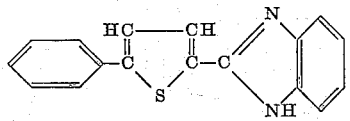

8. The imidazylthiophene compound of the formula

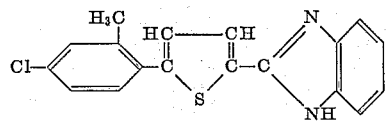

9. The oxazolylthiophene compound of the formula

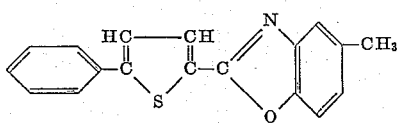

10. The oxazolylthiophene compound of the formula

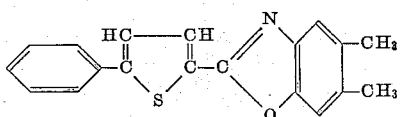

11. The oxazolylthiophene compound of the formula

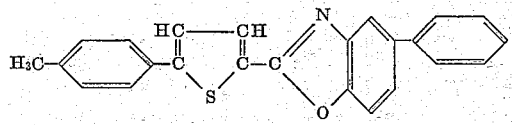

12. The oxazolythiophene compound of the formula

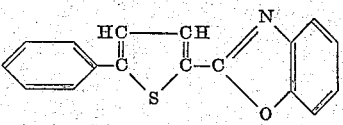

13. The oxazolylthiophene compound of the formula

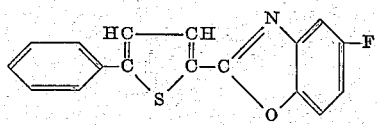

14. The oxazolylthiophene compound of the formula

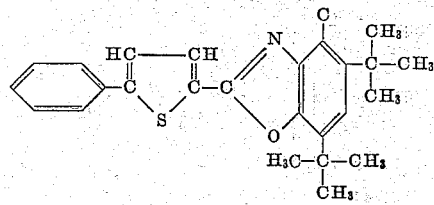

15. The oxazolylthiophene compound of the formula

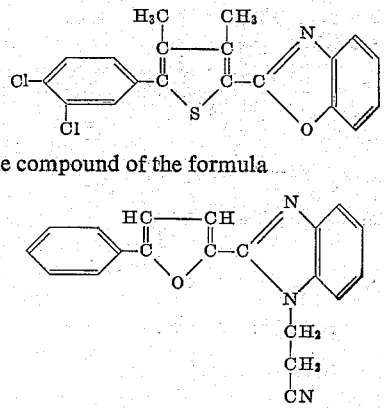

16. The compound of the formula

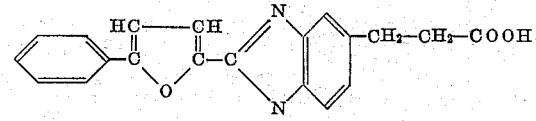

17. The compound of the formula

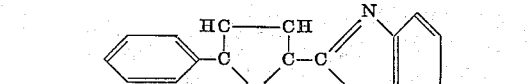

18. The compound of the formula

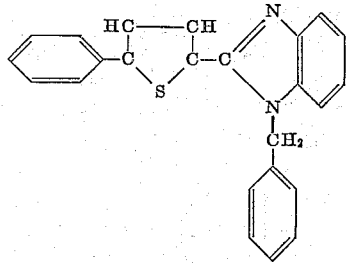

19. The compound of the formula

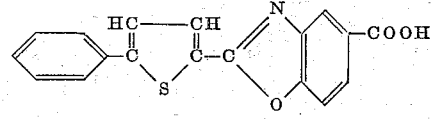

20. The compound of the formula
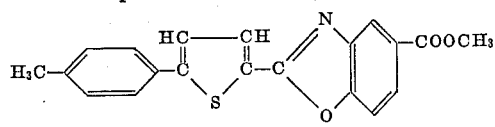
24. The compound of the formula
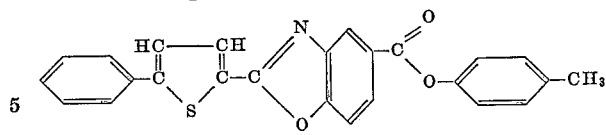
25. The compound of the formula
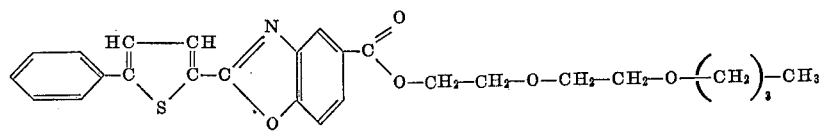
21. The compound of the formula
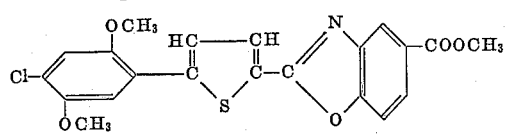
26. The compound of the formula
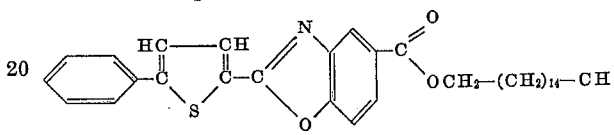
22. The compound of the formula
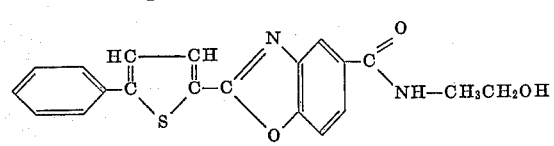
27. The compound of the formula
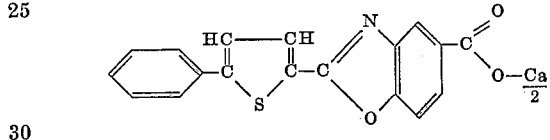
23. The compound of the formula
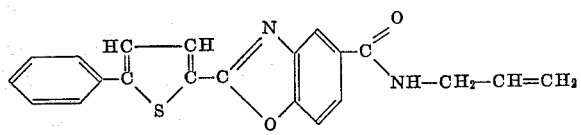
References Cited by the Examiner
UNITED STATES PATENTS
2,985,661   5/1961   Hein et al. -------- 260—307.4
HENRY R. JILES, *Acting Primary Examiner.*
A. D. ROLLINS, *Assistant Examiner.*